United States Patent [19]
Sato

[11] Patent Number: 5,669,021
[45] Date of Patent: Sep. 16, 1997

[54] CAM MECHANISM FOR LENS MOVEMENT

[75] Inventor: Norio Sato, Tokyo, Japan

[73] Assignee: Asahi Kogaku Kogyo Kabushiki Kaisha, Tokyo, Japan

[21] Appl. No.: 669,803

[22] Filed: Jun. 27, 1996

Related U.S. Application Data

[63] Continuation of Ser. No. 274,022, Jul. 12, 1994, abandoned.

[30] Foreign Application Priority Data

Jul. 12, 1993  [JP]  Japan ................ 5-043162 U

[51] Int. Cl.$^6$ ............................................. G03B 1/18
[52] U.S. Cl. .................................... 396/72; 396/79
[58] Field of Search ................... 359/195.1, 700–701;
396/72, 79

[56] References Cited

U.S. PATENT DOCUMENTS

| | | |
|---|---|---|
| 2,319,063 | 5/1943 | Hutchison, Jr. . |
| 4,567,460 | 1/1986 | Daitoku et al. ............... 354/400 |
| 4,707,083 | 11/1987 | Iizuka et al. ............... 350/429 |
| 5,161,066 | 11/1992 | Tanaka et al. . |
| 5,210,644 | 5/1993 | Nomura . |
| 5,225,938 | 7/1993 | Nomura . |
| 5,255,124 | 10/1993 | Iwamura . |
| 5,394,210 | 2/1995 | Nomura et al. ............... 354/195 |

FOREIGN PATENT DOCUMENTS 63-88811  6/1988  Japan .

OTHER PUBLICATIONS

English language translation of the pertinent portions (i.e., p. 19, line 1 through p. 20, line 17) of JP63-88811.

*Primary Examiner*—Michael L. Gellner
*Assistant Examiner*—Daniel Chapik
*Attorney, Agent, or Firm*—Greenblum & Bernstein, P.L.C.

[57] ABSTRACT

A cam mechanism for moving a lens along its optical axis is provided with a cam groove and a cam follower. The cam groove and the cam follower have different curvatures, so that the contact area between the cam groove and the cam follower remains substantially constant within a range of relative positions of the groove and the cam follower.

26 Claims, 2 Drawing Sheets

CAM MECHANISM FOR LENS MOVEMENT

This application is a continuation of application Ser. No. 08/274,022, filed Jul. 12, 1994, now abandoned.

BACKGROUND OF THE INVENTION

The present invention relates to a cam mechanism for moving a lens of a camera.

Generally, in a camera, in order to drive a lens group along an optical axis in accordance with the photographer's intention, a cam mechanism is provided. The cam mechanism has a cam groove formed in a cam ring, which engages a cam follower secured to a lens frame. Upon rotation of the cam ring about the optical axis, the lens frame is moved in the direction of the optical axis, thereby accomplishing the zoom function.

In one known mechanism, the cross sectional shape of the cam groove is a trapezoid, i.e., a truncated V-groove. That is, the channel is flat and narrow at the bottom, with sides sloping from a wider entrance. The trapezoidal shape is determined by manufacturing reasons. The cross sectional shape of a tip of the cam follower pin is a truncated cone of the same approximate size as the cam groove, and therefore corresponds to the shape of the cam groove.

In this conventional arrangement, manufacturing or assembly error may cause misalignment of the cam groove and the cam follower. If the alignment of the cam groove and the cam follower differs from the relation as designed, an uneven and unstable distribution of forces may result. The uneven and unstable distribution of forces can further result in uneven or localized wear of the cam follower groove, and uneven and unstable torque. The lens may move erratically, and the unstable movement may worsen over time.

SUMMARY OF THE INVENTION

It is therefore an object of the present invention to provide an improved cam mechanism, having a relatively constant frictional force and constant torque even when misaligned.

The improved cam mechanism includes a cam ring having at least one cam groove, and at least one cam follower secured to a lens frame, the lens frame moving in the direction of the optical axis when the cam ring is rotated. A surface of the cam follower contacts a surface of the cam groove, and defines an engagement between the cam follower and the cam groove. The contacting surfaces of the cam groove and the cam follower are shaped so that the contact area remains constant within a prescribed range of movement and misalignment does not result in an increase in contact area. The substantially constant contact area results in a substantially constant frictional force, motor load, and wear distribution.

Optionally, the cam follower may have a curved surface where the cam follower and the cam groove contact. The curved surface may be spherical in shape. The cam groove may have a cross-section whereby the bottom of the cam groove is narrower than the entry of said cam groove.

Further optionally, the cam groove may have a semicircular cross-section, defining a curved surface on said cam groove where said cam follower and said cam groove contact. In this case, the cam follower may have a flat surface at a distal end thereof, where the flat surface is substantially parallel with a bottom surface of the cam groove. The cam follower may have a clearance with respect to the bottom surface of the cam groove when the cam follower is engaged with the cam groove.

DESCRIPTION OF THE ACCOMPANYING DRAWINGS

FIG. 1 is a cutaway perspective view of a cam ring and a lens frame in which the present invention may be applied.

FIGS. 2(a) and 2(b) show a cross-sectional view of a first embodiment of the improved cam mechanism of the invention.

FIG. 3(a) and 3(b) show a cross-sectional view of a second embodiment of the improved cam mechanism of the invention.

FIG. 4 is a cross-sectional view of a third embodiment of the improved cam mechanism of the invention.

DESCRIPTION OF THE EMBODIMENTS

With reference to the drawings, an embodiment of the present invention is described.

Figure 1:
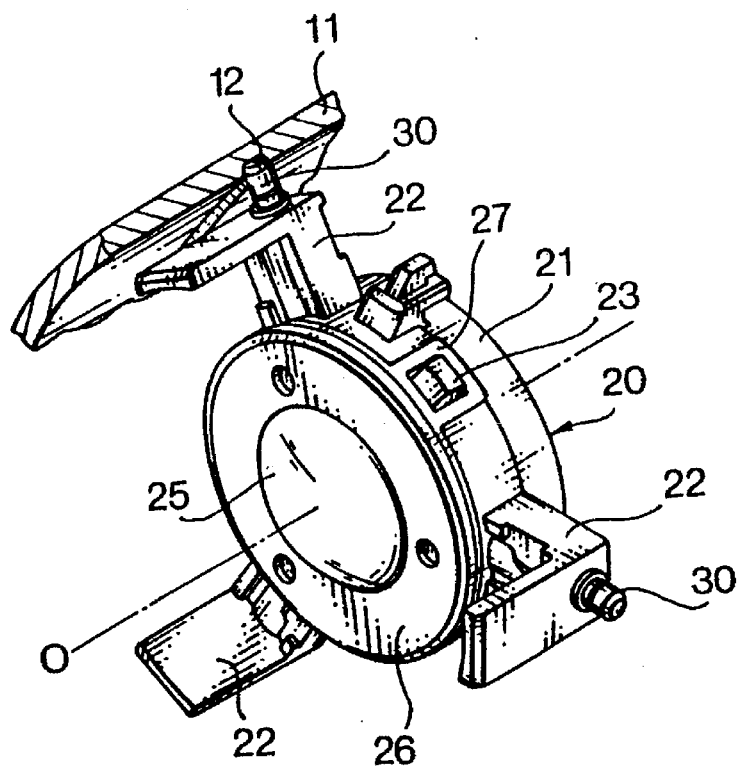

FIG. 1 shows a cutaway portion of a cylindrical cam ring 11 and a lens frame 20 provided with a cam mechanism embodying the present invention. The cam ring 11 is rotatably mounted inside a camera body (not shown), and may be rotated about optical axis O. The cam ring 11 is made of synthetic resin. Cam grooves 12 are formed on the inner surface of the cam ring 11. The cam grooves 12 are formed in a predetermined shape, winding about the rotational axis of the cam ring 11 (i.e., the optical axis O), and cam followers 30 are attached to lens frame 20. Thus, as the cam followers 30 engage the cam groove 12, when the cam ring 11 is rotated, the relative position of the lens frame 20 along the optical axis O is accurately determined by the predetermined shape of the cam grooves 12. The position of the lens frame 20 along the optical axis O is thereby set by the rotary position of the cam ring 11. In order to prevent undercut in a molding process, the cam grooves 11 are formed in a trapezoidal or truncated V-groove shape. That is, the channel is flat and narrow at the bottom, with sides sloping from a wider entrance.

The lens frame 20 is made from a synthetic resin, and includes a cylindrical body 21. Three L-shaped holding members 22 are formed at 120 degree intervals on the body 21. The lens frame 20 is coupled to a linear guide member (not shown), which allows the lens frame to move along the optical axis O while prohibiting rotation about the optical axis O. A metal cam follower 30 is mounted on each of the holding members 22. As shown in FIG. 1, the tips of the cam followers 30 extend radially to engage with the respective cam grooves 12.

Within the lens frame 20, a rear lens group 25, consisting of a plurality of lenses, is accommodated. The rear lens group 25 is fixed within the cylindrical body 21 by means of a circular stopper 26. A plurality of engaging tabs 27 are formed on the edge of the stopper 26, and a plurality of projections 23 are formed on the outer surface of the cylindrical body 21. The engaging tabs 27 engage the respective projections 23, securing the stopper 26 to the body 21.

As described, when the cam ring 11 is rotated, the lens frame 20 is moved along the optical axis O by means of the engagement of the cam follower 30 with the cam groove 12; thus the distance from the rear lens group 25 to the other lenses changes (i.e., zooming).

Figure 2A:
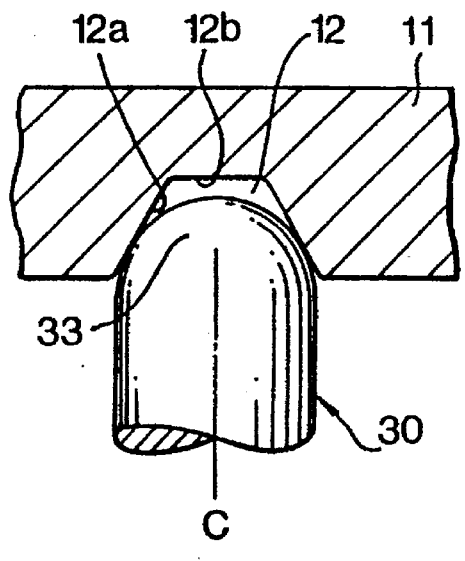
Figure 2B:
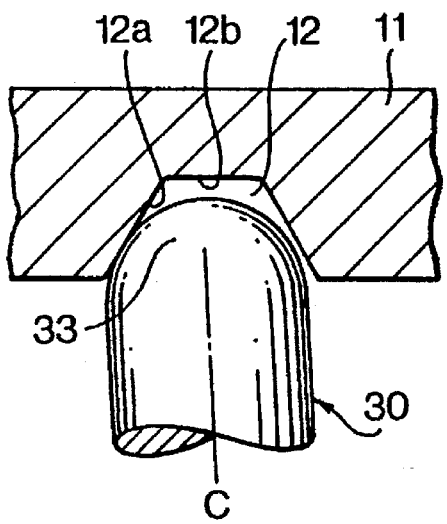

FIG. 2(a) shows an ideal engaging condition of the cam follower 30 with the cam groove 12. The central axis C of the cam follower 30 is properly aligned with the cam groove 30. The central axis C of the cam follower 30 coincides with a central axis (not shown) of the cam groove 12. FIG. 2(b)

shows a misaligned engaging condition of the cam follower 30 with the cam groove 12. The central axis C of the cam follower 30 is inclined with respect to the cam groove 12.

In the first embodiment, the cam follower 30 has a hemispherical tip 33. The cam groove is formed such that some clearance between the hemispherical tip 33 and the bottom of the cam groove 12b will always be maintained. The spherical center of the surface of the hemispherical tip 33 is coincident with the central axis C of the cam follower 30.

As shown in FIG. 2(a), the hemispherical tip 33 contacts the side surfaces 12a on both sides of the cam groove 12 when ideally engaged. The contact area between the hemispherical tip 33 and the side surfaces 12a is small; and therefore; the frictional force is small and the lens frame 20 may move smoothly in the direction of the optical axis O when the cam ring 11 is rotated.

In FIG. 2(b), the surface of the hemispherical tip 33 contacts the side surface 12a only on one side, due to the inclination of the cam follower 30 with respect to the cam groove 12. The location of contact between the cam follower 30 and the cam groove 12 is lower (inner side) than that in FIG. 2(a). However, since the surface of the tip 33 is spherical, the contacting condition and contact area in FIG. 2(b) is almost the same as that in FIG. 2(a). Thus, the frictional force between the spherical surface 31 and the side surface 12a is relatively small, and the lens frame 20 may move smoothly when the cam ring 12 is rotated, even when misaligned.

Figure 3A:
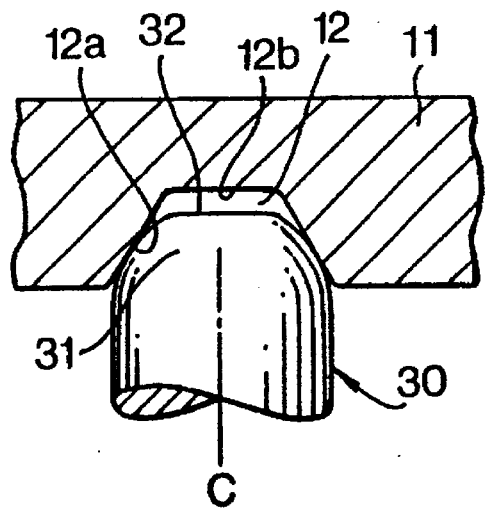
Figure 3B:
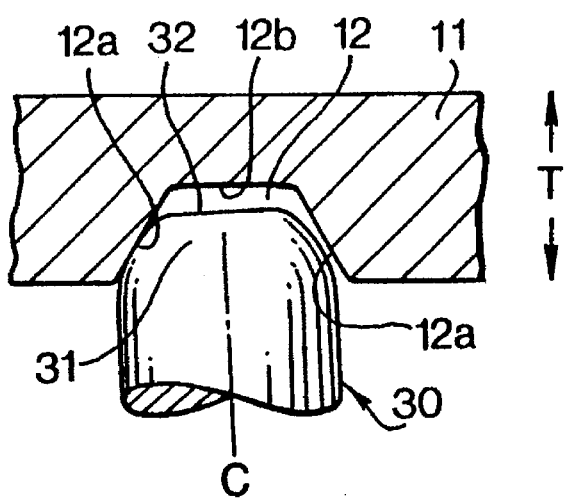

A second embodiment is shown in FIGS. 3(a) and 3(b). As shown in FIG. 3(a) or 3(b), the cam follower has a truncated hemispherical tip having a spherical contacting surface 31 and a flat top surface 32, instead of the hemispherical tip of the first embodiment shown in FIGS. 2(a) and 2(b). When the engaging condition is ideal as shown in FIG. 3(a), the flat top surface 32 is parallel with a flat bottom surface 12b of the cam groove 12. The spherical surface 31 slidably contacts a side surface 12a Of the cam groove, and the flat top surface 32 of the cam follower 30 does not contact the bottom surface 12b of the cam groove 12. The truncation of the hemispherical tip allows a more shallow cam groove 12 than the first embodiment, allowing a thinner cam ring 11 (in direction T in FIGS. 3a and 3b) than the first embodiment. The operation of the second embodiment is otherwise largely the same as the first embodiment.

Figure 4:
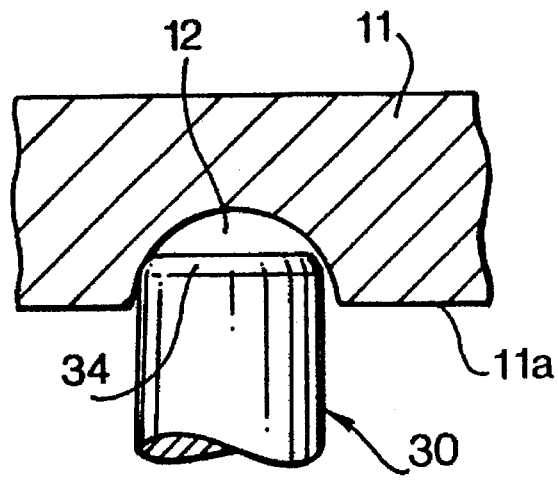

FIG. 4 shows a third embodiment of the present invention. In the third embodiment, a rounded cam groove 12 is formed with a hemispherical cross-section, and the cam follower 30 is a cylindrical shape with beveled edges 34. According to the third embodiment, even if the cam follower 30 is inclined with respect to the rounded cam groove 12, the contacting area and the contacting condition, and therefore the frictional force, are substantially the same. The smooth and accurate movement of the lens frame 20 is thereby ensured.

According to the embodiments described above, the lens frame 20 may move smoothly, even when the cam follower 30 is inclined with respect to the cam groove 12. It is not necessary to apply lubricating oil to the cam groove 12 because of the small contact area and low frictional force of the embodiment. The described construction also lowers the current requirement for a driving electric motor, again due to the low frictional force. Further, the above construction results in superior endurance because of the low rate and even distribution of wear. The present invention therefore accomplishes the object of ensuring lower and relatively stable friction and torque of a zoom lens cam mechanism, even when misaligned. Furthermore, since the cam follower contacts the inner surfaces of the cam groove, even if the manufacturing precision of the inner surface of the cam ring is relatively low, the smooth and accurate movement of the lens frame is ensured.

It is considered that the above-described invention may be applied to any lens system which is movable along the optical axis thereof, although the description is directed to a zoom lens system.

The present disclosure relates to a subject matter contained in Japanese Utility Model Application No. HEI 5-043162, filed on Jul. 12, 1993, which is expressly incorporated herein in its entirety.

What is claimed is:

1. A cam mechanism for moving a lens along a lens optical axis, said cam mechanism comprising:

a cam ring having at least one cam groove formed in an inner surface of said cam ring;

at least one cam follower pin extending substantially perpendicular to the lens optical axis and secured to a lens frame for guiding said lens frame along the optical axis, a distal end of said at least one cam follower pin extending into and contactingly following said at least one cam groove; and contacting surfaces of said at least one cam groove and said at least one cam follower pin being shaped such that a contact area between said at least one cam groove and said at least one cam follower pin remains substantially constant within a predetermined range of angular positions of said at least one cam follower pin away from a position substantially perpendicular to the lens optical axis.

2. The cam mechanism according to claim 1, a surface of one of said at least one cam groove and said at least one cam follower pin having a curved cross section within a plane defined by said lens optical axis and an axis of said at least one cam follower pin.

3. The cam mechanism according to claim 2, said curved cross-section of said at least one of said at least one cam groove and said at least one cam follower having a circular arc shape.

4. The cam mechanism according to claim 2, further comprising:

said at least one cam groove having a plurality of substantially planar surfaces in a cross-section taken along a plane defined by said lens optical axis and said axis of said at least one cam follower pin; and said at least one cam follower pin having a substantially spherical surface contacting one of said plurality of substantially planar surfaces of said at least one cam groove, so that a contact between said cam groove and said cam follower pin is substantially a point contact.

5. The cam mechanism according to claim 4, said at least one cam follower pin having a flat surface at a distal end thereof, said flat surface being substantially parallel with a bottom surface of said cam groove and having a clearance with said bottom surface of said cam groove when engaged with said cam groove.

6. The cam mechanism according to claim 4, said cam groove having a cross-sectional shape such that a bottom of the cam groove is narrower than an entry of said cam groove.

7. The cam mechanism according to claim 2, said at least one cam groove having a substantially concave semicircular cross-section taken along a plane defined by said lens optical axis and said axis of said at least one cam follower pin; and said at least one cam follower pin having a substantially cylindrical shape, so that contact between said at least one cam groove and said at least one cam follower pin is substantially a point contact.

8. The cam mechanism according to claim 5, said distal end of said cam follower pin being beveled.

9. The cam mechanism according to claim 1, said lens frame moving in a direction of an optical axis of a lens accommodated in said lens frame, when said cam ring is rotated.

10. The cam mechanism according to claim 1, said at least one cam follower pin being secured to the outer circumferential surface of said lens frame.

11. The cam mechanism according to claim 10, said at least one cam follower pin comprising a plurality of cam follower pins distributed about said outer circumferential surface of said lens frame, said lens frame being supported within said cam ring solely by said plurality of cam follower pins.

12. A cam mechanism for a camera, comprising:

a cam ring, a substantially helical cam groove formed in an inner surface of said cam ring, said helical cam groove having a first engaging surface;

a lens frame housing a lens, said lens frame having a plurality of cam follower pins spaced circumferentially about said lens frame, each of said plurality of cam follower pins having a second engaging surface and extending substantially perpendicularly to an optical axis of said lens, said lens frame being movable along the optical axis by relative rotation of said lens ring and said lens frame about the optical axis; and a cross-section, along a plane containing the optical axis, of one of said first and second engaging surfaces being a curved surface and a cross-section, along a plane containing the optical axis, of a remaining one of said first and second engaging surfaces being a plurality of substantially straight surfaces.

13. The cam mechanism according to claim 12, wherein said lens frame is supported within said cam ring solely by engagement between said plurality of cam follower pins and said cam groove.

14. The cam mechanism according to claim 13, wherein a contact area between said first and second engaging surfaces remains substantially constant when said cam follower deviates from an orientation perpendicular to the optical axis, within a predetermined range of deviation of said cam follower from the optical axis.

15. The cam mechanism according to claim 14, said first engaging surface comprising a substantially semicircular cross section, taken along a plane containing said optical axis, and said second engaging surface comprising a flat circular surface at a free end of a cylinder.

16. The cam mechanism according to claim 14, wherein said first engaging surface is formed with a flat bottom and linear angled sides in a cross section taken along a plane containing the optical axis, and said second engaging surface is formed as a hemisphere at a free end of a cylinder.

17. The cam mechanism according to claim 12, wherein said first engaging surface is formed with a flat bottom and linear angled sides in a cross section taken along a plane containing the optical axis, and said second engaging surface is formed as a hemisphere at a free end of a cylinder, said hemisphere being truncated to have a flat end surface substantially parallel to said flat bottom of said first engaging surface.

18. The cam mechanism according to claim 1, wherein a first engaging surface of said at least one cam groove and a second engaging surface of said at least one cam follower pin remain substantially constant when said at least one cam follower pin deviates from an orientation perpendicular to said optical axis, within a predetermined range of angular positions of said at least one of cam follower pin about the perpendicular to said optical axis.

19. The cam mechanism according to claim 18, said first engaging surface comprising a substantially semicircular cross section, taken along a plane containing said optical axis, and said second engaging surface comprising a flat circular surface at a free end of a cylinder.

20. The cam mechanism according to claim 18, wherein said first engaging surface is formed with a flat bottom and linear angled sides in a cross section taken along a plane containing the optical axis, and said second engaging surface is formed as a hemisphere at a free end of said cylinder.

21. The cam mechanism according to claim 18, wherein said first engaging surface is formed with a flat bottom and linear angled sides in a cross section taken along a plane containing the optical axis, and said second engaging surface is formed as a hemisphere at a free end of a cylinder, said hemisphere being truncated to have a flat end surface substantially parallel to said flat bottom of said first engaging surface.

22. A cam mechanism for moving a lens along a lens optical axis, said cam mechanism comprising:

a cam ring having at least one cam groove formed in an inner surface of said cam ring;

at least one cam follower pin extending substantially perpendicular to the lens optical axis and secured to a lens frame for moving said lens frame along the optical axis, a distal end of said at least one cam follower pin extending into and contactingly following said at least one cam groove, said at least one cam follower pin comprising a sole support of said lens frame; and contacting surfaces of said at least one cam groove and said at least one cam follower pin being shaped such that a contact area between said at least one cam groove and said at least one cam follower pin remains substantially constant within a predetermined range of angular positions of said at least one cam follower pin away from a position substantially perpendicular to the lens optical axis.

23. The cam mechanism according to claim 22, wherein said at least one cam groove has a substantially concave semicircular cross-section taken along a plane defined by said lens optical axis and said axis of said at least one cam follower pin, and said at least one cam follower pin is a cylinder.

24. The cam mechanism of claim 23, wherein said distal end of said cylinder is beveled.

25. The cam mechanism according to claim 22, wherein said at least one cam groove has a flat bottom and linear angled sides in a cross section taken along a plane containing the optical axis, and said second engaging surface is formed as a hemisphere at a free end of a cylinder.

26. A cam mechanism for moving a lens along a lens optical axis, said cam mechanism comprising:

a cam ring having at least one cam groove formed in an inner surface of said cam ring;

at least one cam follower pin extending substantially perpendicular to the lens optical axis and secured to a lens frame for moving said lens frame along the optical axis, a distal end of said at least one cam follower pin extending into and contactingly following said at least one cam groove; and contacting surfaces of said at least one cam groove and said at least one cam follower pin being shaped such that contact between said at least one cam groove and said at least one cam follower pin remains substantially point contact within a predetermined range of angular positions of said at least one cam follower pin away from a position substantially perpendicular to the lens optical axis.

* * * * *